(No Model.)
P. THOMAS, J. E. MORRIS, J. H. CHATTIN & J. T. FISHER.
NUT LOCK.
No. 304,148. Patented Aug. 26, 1884.
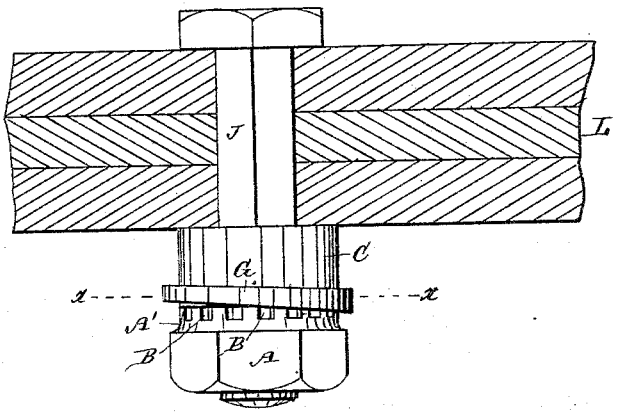
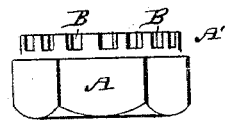
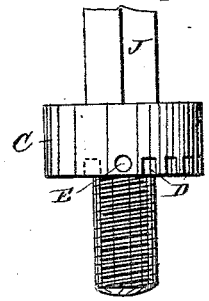
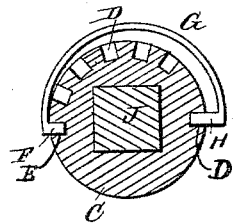
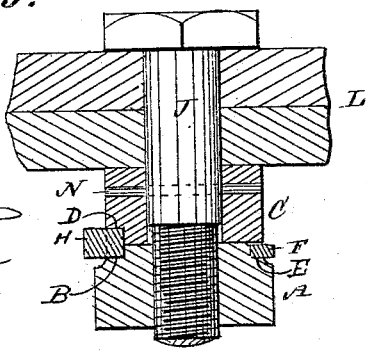
WITNESSES:
Theo. G. Hoster
C. Sedgwick
INVENTOR:
P. Thomas
J. E. Morris
J. H. Chattin
J. T. Fisher
BY Munn & Co
ATTORNEYS.

UNITED STATES PATENT OFFICE.

PHILIP THOMAS, JAMES E. MORRIS, JOHN H. CHATTIN, AND JAMES T. FISHER, OF BRIGHTON, WEST VIRGINIA.

NUT-LOCK.

SPECIFICATION forming part of Letters Patent No. 304,148, dated August 26, 1884.

Application filed April 2, 1884. (No model.)

*To all whom it may concern:*

Be it known that we, PHILIP THOMAS, JAMES E. MORRIS, JOHN H. CHATTIN, and JAMES T. FISHER, of Brighton, in the county of Mason and State of West Virginia, have invented a new and Improved Nut-Lock, of which the following is a full, clear, and exact description.

The invention consists in the combination, with a nut having notches in its rim along the inner edge, of a washer-disk having notches in its rim along the outer edge, and of a semicircular spring held at one end on the nut or disk, and provided at the opposite end with a tooth or prong adapted to be passed into a notch in the disk, and a notch in the nut for locking the nut and disk together.

Reference is to be had to the accompanying drawings, forming part of this specification, in which similar letters of reference indicate corresponding parts in all the figures.

Figure 1 is a plan view of our improved nut-lock showing it applied. Fig. 2 is a cross-sectional elevation of the same on the line $x$ $x$, Fig. 1. Fig. 3 is an edge view of the nut. Fig. 4 is a plan view of the bolt and the washer-disk. Fig. 5 is a sectional plan view of a modification of the construction.

The nut A has the inner part of its outer edge made circular, as shown at A', and in the said circular part a series of notches, B, are formed. A washer-disk, C, is provided in its circular rim, and at the outer edge with a series of notches, D, adapted to register with the notches B, and is provided with an aperture, E, for receiving an inwardly-projecting prong or tooth, F, formed on one end of a semicircular spring, G, provided at its opposite end with a tooth, H, of sufficient width to pass into a notch, B, of the nut and a notch, D, of the washer-disk. The washer-disk is provided with a square or polygonal opening for receiving the square or polygonal part of the bolt J, to prevent the washer from twining on the bolt. The bolt is passed through the plates L to be united, the washer-disk C is placed on the bolt and against the outer surface of the plate L, and the nut A is screwed on the threaded part of the bolt and drawn up tightly against the washer-disk. The prong or tooth F of the spring G is passed into the aperture E in the washer-disk, and the tooth H is passed into two regulation-notches, B and D, of the nut A and the disk C and the spring is held in place by its spring-tension. The nut is thus locked on the washer-disk C, and is prevented from turning. If desired, the tooth F can be passed into an aperture in the nut, as shown in Fig. 5, in place of in the aperture in the disk C. If the bolt is round throughout, the disk C is held on the bolt in such a manner that it cannot turn, by a pin, N, passed through the disk and bolt; or the disk can be locked on the plate L, in some suitable manner. If desired, a straight spring can be used, which has one end secured to the plate L, and is provided on its free end with a tooth adapted to be passed into the notches, in the manner described.

We are aware of the fact that a radially grooved or notched washer and nut, together with a forked locking device, have been used.

Having thus described our invention, we claim as new and desire to secure by Letters Patent—

In a lock-nut, the combination of a bolt, a washer, means to prevent the washer from twining upon the bolt, said washer having peripheral notches upon its inner surface, and the semicircular spring-locking device G, having the teeth F H, one tooth entering an aperture in one of the parts, and the other tooth entering opposed notches of the nut and washer, substantially as and for the purpose set forth.

PHILIP THOMAS.
JAMES E. MORRIS.
JOHN H. CHATTIN.
JAMES T. FISHER.

Witnesses:
DAN GIST,
ELIAS BALL.